United States Patent Office 3,334,761
Patented Aug. 8, 1967

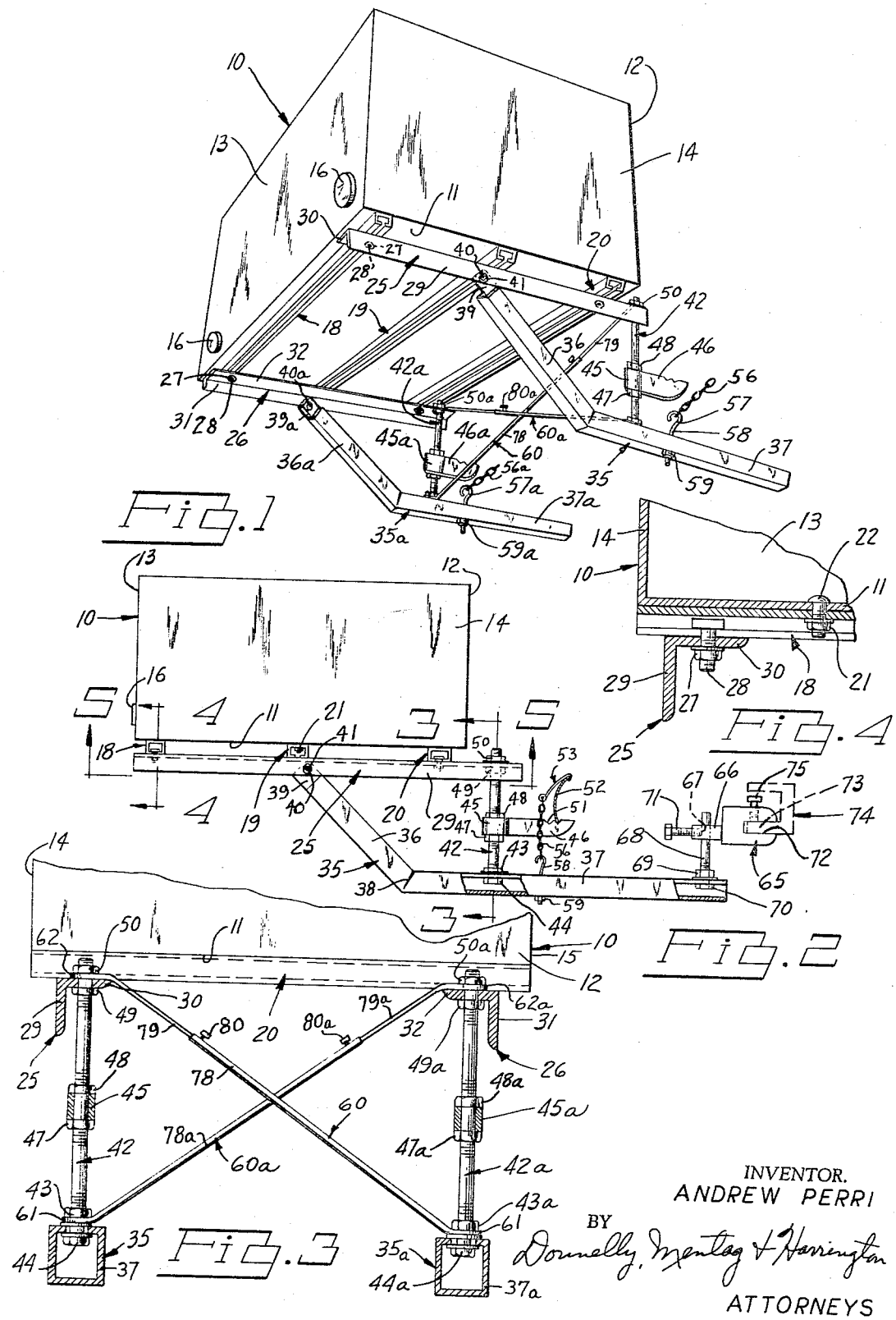

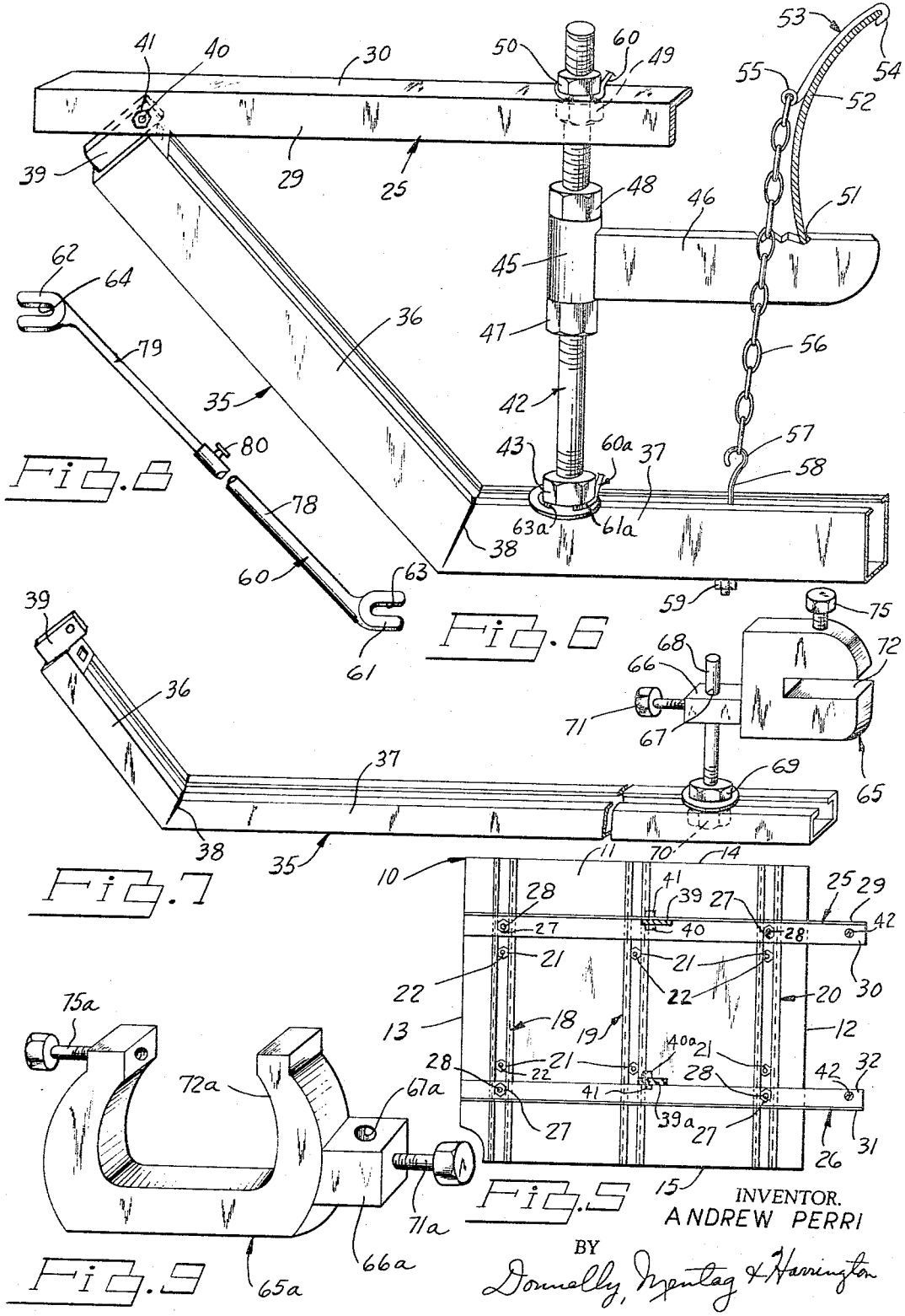

3,334,761
AUTO CARRIER AND DUMP BOX
Andrew Perri, 28151 Pinehurst, Roseville, Mich. 48066
Filed Feb. 3, 1966, Ser. No. 524,685
10 Claims. (Cl. 214—450)

This invention relates generally to detachable multiple purpose auto carriers, and more particularly to an improved article carrier which may be attached to the rear end of an automobile or the like for use as an article carrier and dump box.

In my prior U.S. Patent No. 3,103,290 there is disclosed a novel multiple purpose auto carrier and dump box which is adapted to be quickly and easily attached and detached from an ordinary family automobile. It has been found that the auto carrier and dump box as disclosed in this patent was able to operate efficiently and for the purpose intended.

The multiple purpose auto carrier and dump box illustrated in the above mentioned patent has proven generally satisfactory in use, but it has been found that when it is desired to use the auto carrier and dump box on various sizes of automobiles and various makes of automobiles that it is practically impossilbe to provide a carrier and dump box of this type which would be efficiently adaptable for all makes of cars. For example, many types of automobiles have one type and shape of bumper and other types of automobiles will have other types and shapes of bumpers whereby the bumper clamp means must be variable over a wide range of heights in order to be used on the many different types of bumpers. The bumpers of many automobiles are located at different heights relative to the rear transverse frame, and this presents a problem of providing a bumper clamp means and transverse rear frame clamping means which may be varied infinitely relative to each other in a vertical direction so that the carrier and dump box can be applied to many types of vehicles.

The further problem encountered in the use of the auto carrier and dump box of the above mentioned patent is that the widths of many cars on the market today are different and the carrier frame assemblies could not be infinitely varied laterally relative to each other so that the carrier and dump box could be shifted from a small car to a large car without extensive reworking of the entire carrier and dump box and, in some cases this was not even possible. Accordingly, it is an important object of the present invention to provide a novel and improved auto carrier and dump box which is adapted to overcome the aforementioned disadvantages of the prior art auto carrier and dump box.

It is a further object of this invention to provide an article carrier for attachment to the rear end of an automobile provided with a rear transverse frame member and a rear bumper wherein said carrier comprises an article receptacle; a transverse track means; a pair of laterally spaced apart carrier frame assemblies; means adjustably mounting said carrier frame members on said track means and pivotally attaching said receptacle to said pair of carrier frame assemblies, for lateral adjustment of the carrier frame assemblies relative to each other and for pivotal movement of the receptacle relative to the carrier frame assemblies; clamp means adjustably mounted on each of said carrier frame assemblies for attaching the carrier frame assemblies to said automobile rear transverse frame member; and, clamp means adjustably mounted on each of said carrier frame assemblies for attaching the carrier frame assemblies to said automobile rear bumper.

Other objects, features and advantages of this invention will be apparent from the following detailed description, appended claims, and the accompanying drawings.

In the drawings:

FIG. 1 is a perspective view of an auto carrier and dump box made in accordance with the principles of the present invention;

FIG. 2 is a side elevational view, with parts broken away, of the structure illustrated in FIG. 1, and showing the carrier and dump box mounted on the rear transverse frame member and bumper of an automobile;

FIG. 3 is a fragmentary, enlarged, elevational section view of the structure illustrated in FIG. 2, taken along the line 3—3 thereof, and looking in the direction of the arrows;

FIG. 4 is a fragmentary, enlarged, elevational section view of the structure illustrated in FIG. 2, taken along the line 4—4 thereof, and looking in the direction of the arrows;

FIG. 5 is a bottom plan view of the carrier and dump box illustrated in FIG. 2, taken along the line 5—5 thereof, and looking in the direction of the arrows;

FIG. 6 is a fragmentary, enlarged, elevational perspective view of one of the side frame members of the supporting frame structure employed in the invention;

FIG. 7 is a broken, perspective view, with parts in section, of one of the side frame members, and showing a snap-on clip means for attaching the frame members of the carrier and dump box to an automobile rear transverse frame member;

FIG. 8 is a broken, perspective view of a frame stiffener employed in the invention; and, FIG. 9 is a perspective view of another type of snap-on clip means for detachably mounting the front ends of the carrier and dump box frame members on an automobile rear transverse frame member.

Referring now to the drawings, and in particular to FIGS. 1, 2 and 3, the reference numeral 10 generally indicates a receptacle comprising a box-like structure which is adapted to receive articles that are to be transported on the rear end of an automobile or the like. The receptacle or dump box 10 may be made from any suitable material, as for example, from an aluminum or metallic material. The receptacle 10 comprises a bottom wall 11, front and rear vertical end walls 12 and 13, and side vertical walls 14 and 15. The aforementioned walls 12 through 15 are secured together by any suitable means. If desired, the rear end wall 13 may be hingedly mounted in a well known manner, as for example the manner shown in FIG. 1 of my prior United States Patent No. 3,103,290, to facilitate dumping operations. The receptacle 10 may be provided with suitable red reflecting means as indicated by the numeral 16 in FIG. 1.

As shown in FIGS. 1 and 5, the receptacle 10 is provided with a plurality of transversely disposed, spaced apart base frame members, generally indicated by the numerals 18, 19 and 20, which form the rear, intermediate and front base frame members. The base frame members 18, 19 and 20 are elongated members formed from channel shaped bars which are provided with T-shaped slots or tracks that open downwardly. As best seen in FIGS. 4 and 5, the base frame members 18, 19 and 20 are secured to the receptacle 10 by any suitable means, as by a plurality of bolts 22 and nuts 21.

As best seen in FIG. 1, the carrier and dump box 10 is adjustably mounted on a pair of laterally spaced apart left and right side carrier frame assemblies which are fully described hereinafter. The right side carrier frame assembly includes the members generally indicated by numerals 25 and 35, and the left side carrier frame assembly includes the members generally indicated by the numerals 26 and 35a.

As best seen in FIGS. 1, 3 and 5, the carrier frame assemblies include the laterally spaced apart angle bars 25 and 26. The angle bar 25 includes the vertical flange 29 and the integral horizontal flange 30 which is adjustably connected to the transverse channels 18 and 20 by any suitable means, as by the T-bolts 28 and the nuts 27. FIG. 4 shows an enlarged, fragmentary view of the adjustable mounting of the bolts 28 in the T-shaped tracks or slots formed in the transverse channels 18 and 20. The angle bar 26 is provided in a similar manner with the vertical flange 31 which is integral with the horizontal flange 32 that is adjustably secured to the channels 18 and 20 by a pair of T-bolts 28 and nuts 27.

As seen in FIG. 1, the angle bar 25 comprises the upper member of the right side carrier frame assembly which is mounted on the right side of the receptacle 10. A lower member of the right side carrier frame assembly is generally indicated by the numeral 35 and includes the rearwardly and upwardly sloping part 36 which is integral with the horizontal forwardly extended part 37. As best seen in FIG. 6, the carrier frame member parts 36 and 37 are integrally joined along the line 38, at the front end of the part 36 and the rear end of the part 37.

As best seen in FIG. 6, the upper rear end of the sloping frame part 36 is provided with the attachment lug 39 which is secured to the frame part 36 by any suitable means, as by welding. The attachment lug 39 is pivotly connected to the vertical flange 29 of the angle bar 25 by any suitable means, as by the bolt 40 and the nut 41. It will be seen that the angle bar 25 can thus be pivoted relative to the frame part 36 to permit the receptacle 10 to be rotated in a counterclockwise direction, as viewed in FIG. 2, for dumping purposes.

The angle bar 25 is maintained in the level position shown in FIG. 2 for transporting purposes by the threaded rod 42. As best seen in FIG. 3 the lower end of the threaded rod 42 is adjustably secured to the carrier frame part 36 by means of the nuts 43 and 44. The nut 44 and a suitable washer is seated inside of the track formed by the frame channel member 37, and by loosening the nut 44 the threaded rod 42 may be adjusted vertically relative to the frame part 37. The upper end of the threaded rod 42 is adapted to pass through a suitable hole formed through the horizontal flange 30 of the angle bar 25 and be secured to the angle bar 25 by means of the nuts 49 and 50. It will be seen, that by releasing the nut 50 and by removing the same from the upper end of the threaded rod 42, the receptacle 10 may be tilted counterclockwise, as viewed in FIG. 2, so as to dump the contents therefrom. It will be seen, that the receptacle 10 may be leveled by adjusting the position of the horizontal angle bar flange 30 upwardly or downwardly on the threaded rod 42 by means of the nuts 49 and 50, as desired. As shown in FIGS. 1 and 3, the left side carrier frame assembly is provided with a similar lower member and interconnecting threaded rod, and the corresponding parts have been marked with the same reference numerals followed by the small letter a.

As shown in FIGS. 1 and 6, the receptacle 10 is adapted to be detachably secured to a rear bumper of an automobile, as indicated by the numeral 52, by an adjustable bumper lock or clamp means comprising the following described structure. Each of the left and right side carrier frame assemblies is provided with one of the adjustable bumper clamp assemblies, and the clamp assembly for the right side carrier frame assembly is described and the same reference numerals are applied to the bumper clamp assembly for the left side carrier frame assembly, followed by the small letter a.

As best seen in FIGS. 2 and 6, the right side bumper clamp assembly comprises the sleeve 45 which is adjustably mounted on the threaded rod 42 and adapted to be secured in an adjusted position by means of the nuts 47 and 48. The sleeve 45 has fixed thereto a horizontal, forwardly extended arm 46 which extends forwardly toward the vehicle on which the carrier of the present invention is adapted to be mounted. The arm 46 is in vertical alignment with the carrier frame part 37 and is spaced upwardly therefrom. The arm 46 may be raised or lowered by adjusting the nuts 47 and 48 in the proper directions.

As best seen in FIG. 6, the arm 46 is provided on the upper side thereof with a plurality of spaced apart notches 51 which are adapted to receive the lower end of an automobile bumper 52. It will be understood, that the notches 51 are shaped in accordance with the shape of the lower end of the particular bumper 52 onto which the arm 46 is to be mounted. The numeral 53 generally indicates an elongated clamp arm which may be made in the form of a plate-like arm, or an arm having a round or rod-like cross section. The clamp arm 53 is provided on the upper end thereof with the hook 54 which is adapted to be seated around the upper end of the bumper 52. The lower end of the clamp arm 53 is provided with the loop or attachment member 55 to which is fixed the upper end of the clamp chain 56.

The lower end of the clamp chain 56 is secured to the hook 57 on the upper end of the attachment bolt 58. The lower end of the bolt 58 is threaded and extends down into the track formed by the carrier frame member 37 and through a suitable hole in the lower wall thereof. The bolt 58 is secured in an adjusted position by means of the nut 59. It will be seen that when the nut 59 is tightened, the bolt 58 will draw the chain 56 downwardly so as to clamp the bumper 52 between the clamp arm 46 and the C-shaped upper end 54 on the clamp arm 53. It will be seen that the clamp arm 53 may be curved to suit the particular curvature or shape of the particular bumper 52 on which the receptacle 10 is to be attached.

As shown in FIG. 1, the left side carrier frame assembly is also provided with a similar vehicle bumper clamp means, and the corresponding parts are marked with the same reference numerals followed by the small letter a. It will be seen that the carrier receptacle 10 may be raised or lowered by raising or lowering the clamp arm 46 on the threaded rod 42. The vehicle bumper 52 would be maintained in engagement with the arm 46 by adjusting the nut 59 in an appropriate direction. It will also be seen that the hook 57 on the bolt 58 may be attached to any appropriate link on the chain 56 in accordance with the position of the clamp arm 46.

As shown in FIGS. 2 and 7, the carrier frame assemblies are each provided with a clamp means for attaching the forward ends of the parts 37 and 37a to the rear transverse frame member of an automobile or the like. The numeral 65 indicates a clamp member which is provided with a mounting arm 66 on the rear end thereof. The arm 66 is provided with a vertical hole 67 through which is slidably mounted the vertical support rod 68. The upper end of the rod 68 is preferably circular and smooth, and the lower end is threaded and extended downwardly through the opening of the track formed on the upper side of the frame part 37. The lower end of the support rod 68 is adjustably secured to the track on the part 67 by means of suitable washers and the nuts 69 and 70. It will be understood that the rod 68 can be adjusted forwardly and backwardly on the frame part 37 as desired. Clamp arm 66 is adapted to be secured in a vertically adjusted position on the rod 68 by any suitable means, as by the lock screw 71. The clamp member 65 is provided with a horizontal slot 72 which is open on the front end thereof and into which is slidably received the lower flange 73 of a typical open, transverse auto frame member. The clamp member 65 may be snapped onto the flange 73 if a tight fit is provided. However, a suitable lock means such as the lock screw 75 is provided for securely locking the frame flange 73 in the clamp opening 72.

FIG. 9 shows a modified clamp member 65a and the parts thereof which are similar to the parts of the clamp 65 shown in FIG. 7 are marked with the same reference numerals followed by the small letter a. The clamp member 65a of FIG. 9 is adapted to be used with a box-type transverse auto frame member. In this embodiment the opening 72a is formed on the upper side of the clamp member 65a and the lock screw 75a is disposed horizontally instead of vertically as in the embodiment of FIG. 7. The clamp member 65a is provided with the clamp arm 66a which has the hole 67a therethrough for mounting the same on the rod 68 of the clamp mounting structure shown in FIG. 7. A lock screw 71a secures the lock member 65a in an adjusted position on the rod 68.

It will be seen that the vertically adjustable bumper clamping structure and transverse frame clamping structure of the present invention permits the carrier and dump box of the present invention to be adjustably mounted on automobiles of various makes which have their bumpers and transverse frames shaped and formed differently, and located at different relative heights. Experience has shown that the carrier and dump box of the present invention is a practical, and safe carrier means and that it can be quickly and easily attached to and detached from an automobile as desired.

While it will be apparent that the preferred embodiments of the invention herein disclosed are well calculated to fulfill the objects above stated, it will be appreciated that the invention is susceptible to modification, variation and change without departing from the proper scope or fair meaning of the subjoined claims.

What I claim is:
1. An article carrier for attachment to the rear end of an automobile provided with a rear transverse frame member and a rear bumper, comprising:
  (a) an article receptacle having a bottom wall;
  (b) a transverse track means attached to the outer face of said bottom wall;
  (c) a pair of laterally spaced apart carrier frame assemblies which each comprise an upper member and a lower member;
  (d) means adjustably mounting said carrier frame assembly upper members on said track means and pivotally attaching said receptacle and upper frame members to the lower members of the carrier frame assemblies, for lateral adjustment of the carrier frame assemblies relative to each other and for pivotal movement of the receptacle and said upper members relative to the lower members of the carrier frame assemblies;
  (e) clamp means adjustably mounted on each of said carrier frame assemblies for attaching the carrier frame assemblies to said automobile rear transverse frame member; and,
  (f) clamp means adjustably mounted on each of said carrier frame assemblies for attaching the carrier frame assemblies to said automobile rear bumper.
2. An article carrier as defined in claim 1, wherein:
  (a) said track means comprises a plurality of spaced apart, transversely disposed, elongated members secured to the outer face of the bottom wall of the article receptacle; and,
  (b) each of said elongated members is provided with a longitudinal recess which forms a track for the slidable reception of the means adjustably mounting said carrier frame upper members on the track.
3. An article carrier as defined in claim 2 wherein:
  (a) each of the lower members of said carrier frame assemblies includes an elongated horizontal forwardly extended part and an upwardly and rearwardly sloping elongated rearward part attached to the rear end of the horizontal forwardly extended part;
  (b) the upper end of said rearward part is pivotally attached to the rear end of one of said upper members; and,
  (c) said forwardly extended horizontal part is releasably secured to the front end of said one last mentioned upper member for normally retaining the receptacle in a level, load carrying position, and to allow the last mentioned upper member to be detached therefrom to allow the receptacle to be pivoted for dumping operations.
4. An article carrier as defined in claim 3, including:
  (a) an adjustable frame stiffener means interconnected between said carrier frame assemblies.
5. An article carrier as defined in claim 3, wherein:
  (a) the horizontal forwardly extended part of each carrier frame assembly lower member is attached to its respective upper member by a vertically disposed rod which is releasably secured at the lower end thereof to the horizontal forwardly extended part and at the upper end thereof to its respective upper member.
6. An article carrier as defined in claim 5, wherein:
  (a) said clamp means for attaching each of said carrier frame assemblies to the automobile rear bumper includes, an arm adjustably mounted on each of said rods and provided with means for engaging the lower side of said bumper;
  (b) a pair of clamp arms having means on the upper end adapted to engage the upper side of said bumper; and,
  (c) means attached to the lower end of each of said last mentioned clamp arms and releasably secured to one of said horizontal forwardly extended part of one of said lower members.
7. An article carrier as defined in claim 6, wherein:
  (a) said means for attaching the lower ends of the clamp arms to the lower members comprises a pair of chains which are each adjustably secured to one of said lower members.
8. An article carrier as defined in claim 5, wherein:
  (a) said clamp means for attaching each of said carrier frame assemblies to the automobile rear transverse frame member comprises a vertically disposed rod adjustably mounted on each carrier frame assembly lower member horizontal forwardly extended part for adjustment lengthwise of the horizontal forwardly extended part;
  (b) a clamp member adjustably mounted on said last mentioned rod for vertical adjustment on said rod;
  (c) said clamp member being provided with an opening for engagement with the automobile rear transverse frame member; and,
  (d) means for securing the transverse frame member in said clamp member opening.
9. An article carrier as defined in claim 8, wherein:
  (a) said opening in said clamp member is disposed vertically.
10. An article carrier as defined in claim 8, wherein:
  (a) said opening in said clamp member is disposed horizontally.

References Cited

UNITED STATES PATENTS

| | | | |
|---|---|---|---|
| 2,204,824 | 6/1940 | Rock | 224—42.08 |
| 3,103,290 | 9/1963 | Perri | 224—42.08 |
| 3,239,081 | 3/1966 | Poleschuk | 214—84 |

HUGO O. SCHULZ, *Primary Examiner.*

GERALD M. FORLENZA, *Examiner.*

F. E. WERNER, *Assistant Examiner.*